Jan. 16, 1934.   H. G. REIST   1,944,107
TOTALLY INCLOSED DYNAMO ELECTRIC MACHINE
Filed March 9, 1931   2 Sheets-Sheet 1

Inventor:
Henry G. Reist,
by Charles V. Tulla
His Attorney.

Jan. 16, 1934.  H. G. REIST  1,944,107
TOTALLY INCLOSED DYNAMO ELECTRIC MACHINE
Filed March 9, 1931  2 Sheets-Sheet 2

Inventor:
Henry G. Reist,
by Charles V. Tulla
His Attorney.

Patented Jan. 16, 1934

1,944,107

UNITED STATES PATENT OFFICE 1,944,107

TOTALLY INCLOSED DYNAMO-ELECTRIC MACHINE

Henry G. Reist, Schenectady, N. Y., assignor to General Electric Company, a corporation of New York Application March 9, 1931. Serial No. 521,201

7 Claims. (Cl. 171—252)

My invention relates to totally inclosed dynamo-electric machines, and more particularly to an arrangement of surface coolers in such machines.

In constructing totally inclosed dynamo-electric machines heretofore, it has been the practice to arrange the surface coolers employed in the machines in such manner that it has been inconvenient to obtain access to the coolers when desired for cleaning or repair. Moreover, these constructions have occupied considerable space.

The object of my invention is to provide a dynamo-electric machine of this type in which the coolers can readily be removed and which will make possible a very compact construction. I accomplish this by providing a totally inclosed dynamo-electric machine having stationary and rotatable members, an arrangement including an end-head for inclosing the machine having a cooler therein, and baffles for directing cooling gas from the machine through the cooler into the end-head and for directing cooling gas from the end-head into the machine.

My invention will be more fully set forth in the following description referring to the accompanying drawings, and the features of novelty which characterize my invention will be pointed out with particularity in the claims annexed to and forming a part of this specification.

Figure 1:
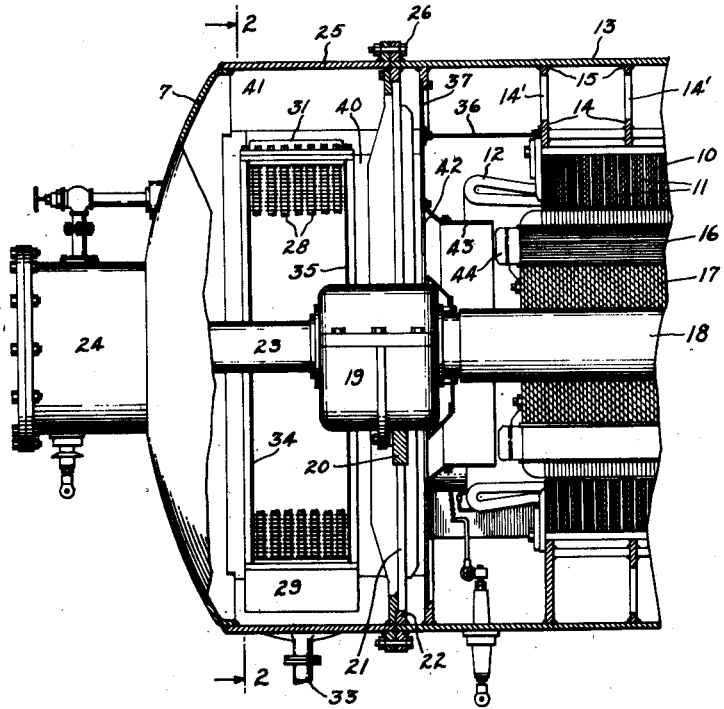
Figure 2:
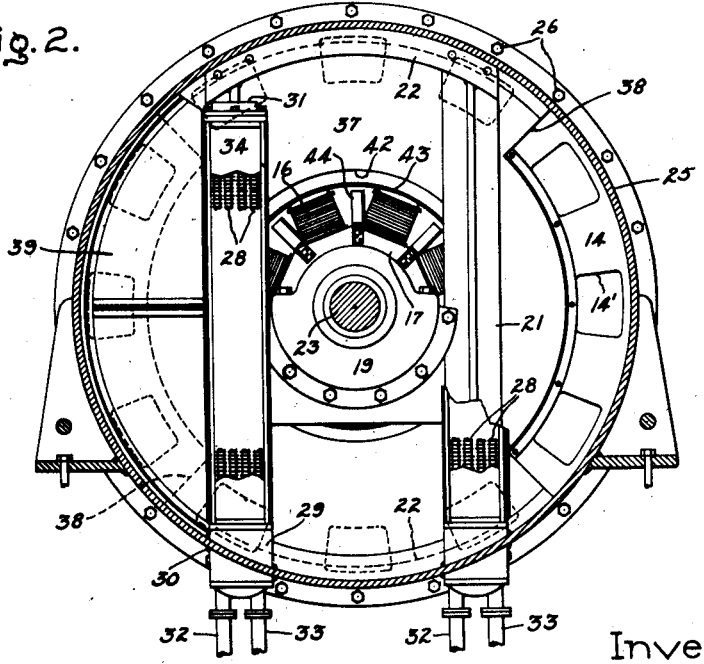
Figure 3:
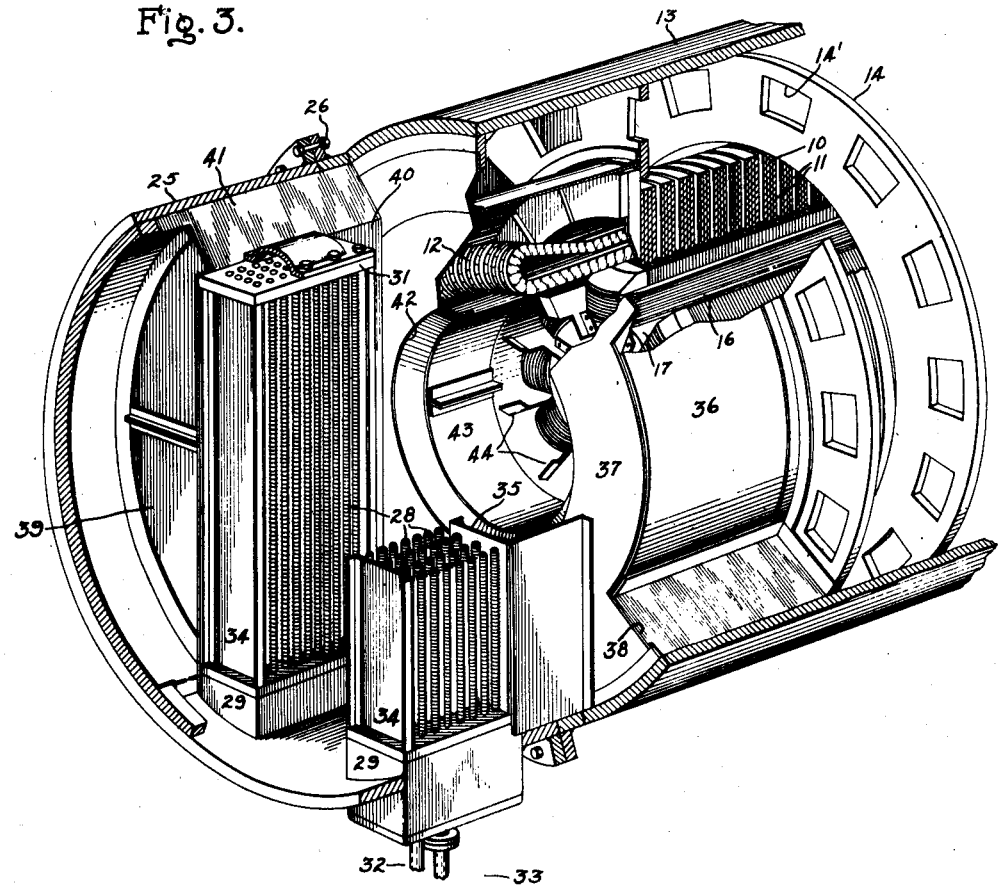

In the drawings Fig. 1 is a side elevation of a dynamo-electric machine embodying my invention, a portion being shown in longitudinal section; Fig. 2 is a section on the line 2—2 of Fig. 1, and Fig. 3 is a perspective view of my improved construction partly broken away.

Referring to the drawings, as an example of one manner of carrying out my invention, I have shown a totally inclosed dynamo-electric machine of the hydrogen cooled type including a stationary member 10 having a laminated core structure provided with radially arranged ducts 11 extending therethrough, and a winding 12 arranged in the slots of the core structure in the usual manner. This core structure is supported in the cylindrical inclosing housing 13, containing hydrogen or other suitable cooling gas, by a plurality of annular plates 14 surrounding the laminations which are spaced apart and welded to the cylindrical housing 13 at 15, the annular plates 14 being provided with openings 14' so that the cooling gas can flow from the space between the core structure and the housing 13 toward the end of the housing. The rotatable member of the machine comprises a plurality of salient poles 16 secured to a body 17 built up of plates which are secured together and mounted on a shaft 18. The shaft 18 is journaled in a bearing 19 which is supported inside of the cylindrical housing 13 by a transverse bar 20 and vertical bars 21 which are welded at their opposite ends to segments 22 secured inside of the housing 13.

The portion 23 of the shaft 18 extends beyond the bearing 19 into an auxiliary housing 24 in which the current-collecting devices of the machine are arranged. This auxiliary housing is constructed in such manner that the current-collecting devices are readily accessible without removing the cooling gas from the machine as described and claimed in the application of Earle S. Henningsen, Serial No. 456,608, filed May 28, 1930, and assigned to the same assignee as the present application.

In order to cool the inclosed dynamo-electric machine during its operation the cooling gas is circulated therein through surface coolers so that the heat from the machine is transferred from the machines to the coolers. In accordance with my invention I arrange surface coolers in the machine in such manner that the coolers can be readily applied to the machine and removed therefrom when desired, and that a compact construction is obtained. I do this by providing an end-head 25 which is bolted to the housing 13 at 26 and is closed by an end wall 27 to which the auxiliary housing 24 is secured. I prefer to provide two vertically arranged surface coolers comprising a plurality of finned tubes 28 which extend from headers 29 welded in openings 30 in the end-head 25. The upper end of these pipes communicate with headers 31, the lower headers being partitioned so that water is supplied to the coolers through pipes 32 and conducted through one group of tubes 28 to the upper header 31 from whence it flows downwardly through another group of tubes 28 to the outlet pipe 33. These coolers are provided with plates 34 and 35 at the sides thereof extending between the headers to form ducts directing the cooling gas over the surface of the finned tubes 28. In order to form passages for directing cooling gas from the space between the core structure and the housing 13 to the coolers, I provide a baffle 36 arranged about the end-turns of the winding 12 and extending between the end of the core structure and a transverse baffle 37 secured to the housing having arcuate openings 38 therein through which the cooling gas flows to the coolers. I direct the cooling gas flowing through the openings 38 through the coolers into the end-head, by providing an arcuate baffle 39 extending from the wall of the end-head 25 to the plates 34, and a vertical baffle plate 40 extending between the transverse baffle plate 37 and the plates 35 at the adjacent sides of the coolers. The upper ends of the baffle plates 40 extend to the wall of the end-head 25 as indicated at 41 and cooperate with the arcuate baffle plate 39 to form a duct for the cooling gas flowing from the housing 13 into the end-head through the cooler.

After passing through the coolers into the end-head the cooling gas flows through a central opening 42 in the transverse baffle plate 37, and the cylindrical extension 43 arranged inside of the end-turns of the winding 12 and into the end of rotatable member of the machine. In order to impel the cooling gas through the cooling system in this way, I provide fans 44 on the rotatable member which draw the cooling gas into the space between the poles of the machines from whence it is impelled outwardly through the air ducts 11 into the space between the core structure and the housing 13.

From the foregoing it will be understood that I have provided a totally inclosed dynamo-electric machine of compact construction in which the cooling gas is circulated through the ducts formed by the baffles, and that the coolers can be readily removed when desired without disturbing the bearings 19 of the machine upon taking out bolts 26.

Although I have described a particular embodiment of my invention, I do not desire to be limited thereto, and I intend in the appended claims to cover all modifications which do not depart from the spirit and scope of my invention.

What I claim as new and desire to secure by Letters Patent of the United States, is:

1. A totally inclosed dynamo-electric machine having stationary and rotatable members, means including a removable end-head for inclosing said machine, a cooler arranged inside of said end-head at one side of the axis of said rotatable member and extending transversely of the axis of said rotatable member in spaced relation to said end-head, means including a duct inside of said end-head and extending between said cooler and said end-head for directing cooling gas from said machine through said cooler into said end-head and for directing cooling gas from said end-head into said machine.

2. A totally inclosed dynamo-electric machine having rotatable and stationary members, means including an end-head for inclosing said machine and forming a passage about said stationary member, a cooler arranged inside of said end-head at one side of the axis of said rotatable member and extending transversely of the axis of said rotatable member in spaced relation to said end-head, a transverse baffle at the end of said stationary member having an extension forming a duct extending between said end-head and said cooler, said extension cooperating with said cooler to form a passage extending from the outer periphery of said stationary member to said cooler and opening through said cooler into said end-head, said transverse baffle having an opening therein affording communication between said end-head and the end of said rotatable member, and means for directing the cooling gas from said end-head into the end of said rotatable member.

3. A totally inclosed dynamo-electric machine having rotatable and stationary members, means including an end-head for inclosing said machine and forming a passage about said stationary member, a cooler arranged inside of said end-head at one side of the axis of said rotatable member and extending transversely of the axis of said rotatable member in spaced relation to said end-head, and a transverse baffle at the end of said stationary member having an extension cooperating with the wall of said end-head to form a passage extending from the space about the outer periphery of said stationary member to said cooler and opening through said cooler into said end-head, said baffle having another extension arranged about said rotatable member and opening at the end of said rotatable member for conducting air thereto from said end-head.

4. A totally inclosed dynamo-electric machine having a rotatable member and a stationary member including a core structure provided with ducts extending from the inner to the outer periphery thereof and a winding, said stationary member including a housing surrounding said core structure in spaced relation thereto, a transverse baffle at the end of said stationary member having a tubular portion spaced from said housing and extending about the end-turns of the winding on said core structure, an end-head secured to said housing having coolers therein, and means extending from said baffle for directing gas from said housing through said coolers into said end-head, said transverse baffle having a central opening at the end of said rotatable member for returning the gas to said machine.

5. A totally inclosed dynamo-electric machine having rotatable and stationary members, means including an end-head for inclosing the machine, coolers secured in said end-head on opposite sides of the axis of the machine and including ducts for the circulation of a cooling medium therethrough, means for directing cooling gas from the outer periphery of said stationary member through each of said coolers into said end-head toward the axis of said rotatable member, and means for directing cooling gas from said end-head toward the end of said rotatable member.

6. A totally inclosed dynamo-electric machine having rotatable and stationary members, means including an end-head for inclosing the machine, coolers secured in said end-head on opposite sides of the axis of the machine and including ducts for the circulation of a cooling medium therethrough, a transverse baffle between said coolers and said stationary member having walls extending into said end-head and cooperating therewith to form passages for circulating air from the machine through said coolers and into the machine.

7. A totally inclosed dynamo-electric machine having rotatable and stationary members, means including an end-head for inclosing the machine, vertically extending coolers secured in said end-head on opposite sides of the axis of the machine and including ducts for the circulation of cooling medium therethrough, and a transverse baffle between said coolers and said stationary members and having walls extending into the end-heads and cooperating therewith to form passages for circulating cooling gas from the machine through said coolers and into the end of the rotatable member of the machine.

HENRY G. REIST.